US009482159B2

(12) United States Patent
Ozawa (10) Patent No.: US 9,482,159 B2
(45) Date of Patent: Nov. 1, 2016

(54) POWER GENERATION SYSTEM AND OPERATING METHOD THEREOF

(71) Applicant: MITSUBISHI HITACHI POWER SYSTEMS, LTD., Nishi-ku, Yokohama (JP)

(72) Inventor: Hiroyuki Ozawa, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 376 days.

(21) Appl. No.: 14/183,470

(22) Filed: Feb. 18, 2014

(65) Prior Publication Data
US 2014/0230450 A1  Aug. 21, 2014

(30) Foreign Application Priority Data

Feb. 20, 2013  (JP) .................. 2013-031451

(51) Int. Cl.
*F02C 9/40* (2006.01)
*F02C 3/28* (2006.01)

(52) U.S. Cl.
CPC . *F02C 9/40* (2013.01); *F02C 3/28* (2013.01); *Y02E 20/16* (2013.01)

(58) Field of Classification Search
CPC .................................. F02C 9/40; F02C 3/28
USPC ................. 60/39.12, 784, 39.23, 39.27, 794, 60/39.281
See application file for complete search history.

(56) References Cited

U.S. PATENT DOCUMENTS

| 6,077,620 A * | 6/2000 | Pettit ...................... B01J 8/0438 429/425 |
| 7,150,143 B2 | 12/2006 | Schick et al. |
| 7,895,821 B2 * | 3/2011 | Annigeri .................. F02C 3/20 60/39.281 |

FOREIGN PATENT DOCUMENTS

| JP | 2006-097638 A | 4/2006 |
| JP | 2007-002762 A | 1/2007 |

* cited by examiner

*Primary Examiner* — Jason L Vaughan
(74) *Attorney, Agent, or Firm* — Hauptman Ham, LLP (57) ABSTRACT

A power generation system has a fuel cell, a gas turbine, an exhausted oxidant line, a fuel gas supply line, an exhausted fuel gas supply line, a supply amount adjustment unit, and a control system including an information acquisition unit, a calculation unit, and a fuel gas supply control unit. The information acquisition unit acquires an output command of the gas turbine, an atmospheric temperature, a temperature of the exhausted oxidant supplied to the gas turbine, and a temperature of the exhausted fuel gas supplied to the gas turbine. The calculation unit calculates a heat input of the exhausted oxidant, calculates a heat input of the exhausted fuel gas, and calculates by the output command and the atmospheric temperature to calculate a gas turbine heat input command.

8 Claims, 6 Drawing Sheets

POWER GENERATION SYSTEM AND OPERATING METHOD THEREOF

RELATED APPLICATIONS

The present application claims priority to Japanese Application No. 2013-031451, filed on Feb. 20, 2013, the disclosure of which is hereby incorporated by reference herein in its entirety.

FIELD

The present invention relates to a power generation system in which a fuel cell, a gas turbine, and a steam turbine are combined and an operating method of the power generation system.

BACKGROUND

A solid oxide fuel cell (hereinafter, referred to as SOFC) has been known as a fuel cell of high efficiency to be widely used. Because the SOFC has a high operating temperature to increase ionic conductivity, the SOFC can use air discharged from a compressor of a gas turbine as air (oxidant) supplied to the side of an air electrode (cathode). In addition, an unused high-temperature fuel and waste heat exhausted from the SOFC can be used as fuel and an oxidant in the combustor of the gas turbine. Further, other than the SOFC, a molten carbonate fuel cell is known as a fuel cell having a high operation temperature, and, similarly to the SOFC, the use of waste heat thereof in cooperation with a gas turbine has been examined.

For this reason, for example, as described in the following Patent Literature 1, various systems in which the SOFC, the gas turbine, and the steam turbine are combined, have been suggested as power generation systems that can achieve power generation of high efficiency. In combined systems described in Patent Literatures 1 and 2, the SOFC and the gas turbine having the gas turbine combustor burning exhausted fuel gas and exhausted air discharged from the SOFC and the compressor compressing air and supplying the air to the SOFC are provided.

The combined system described in Patent Literature 1 has a fuel gas flow line that supplies fuel gas output from the SOFC (fuel cell) to the combustor and a combustible gas bypass flow line that supplies combustible gas generated in the system to the fuel gas flow line and controls an amount of combustible gas supplied from the combustible gas bypass flow line to the fuel gas flow line to make a calorific value in an inlet of the combustor of the gas turbine constant. In addition, in Patent Literature 2, in the combined system including the SOFC (fuel cell) and the gas turbine, a plurality of fuel systems supplying fuel to the gas turbine are provided and a flow rate of each system is adjusted.

CITATION LIST

Patent Literature

Patent Literature 1: Japanese Laid-open Patent Publication No. 2006-97638
Patent Literature 2: Japanese Laid-open Patent Publication No. 2007-2762

SUMMARY

Technical Problem

In the above-described power generation system, a component or a temperature of the fuel or the air that is discharged from the SOFC and is supplied to the combustor of the gas turbine may change. In particular, during start-up to steady power generating state, increasing temperature or pressure in the SOFC is needed and the component, the flow rate, and the temperature of the exhausted fuel gas or the exhausted air (exhausted oxidant) supplied to the gas turbine greatly change. If the component, the flow rate, and the temperature of the exhausted fuel or the exhausted air (exhausted oxidant) supplied from the SOFC to the combustor of the gas turbine change, burning conditions in the gas turbine combustor change and thus operating of the gas turbine becomes unstable and problems may occur.

Meanwhile, in Patent Literature 1, a supply amount is adjusted by adjusting an aperture of a control valve of each system on the basis of a power generation output and in Patent Literature 2, a supply amount of combustible gas supplied together with the combustible gas output from the fuel cell and supplied in other systems is adjusted to make a calorific value constant. However, there is room for improvement in operating the gas turbine stably and efficiently by flue gas burned using the exhausted fuel gas and the exhausted air (exhausted oxidant) from the SOFC. Even in the case of using the fuel cell other than the SOFC, the same problems occur.

The present invention has been made to resolve the above-described problems and it is an object of the present invention to provide a power generation system and an operating method of the power generation system that can control a fuel flow to enable stabled burning in a combustor of a gas turbine and output control without depending on an operating state of an SOFC and to stably operate the gas turbine.

Solution to Problem

According to an aspect of the present invention, a power generation system includes: a fuel cell; a gas turbine including a combustor; an exhausted oxidant line that supplies exhausted oxidant from the fuel cell to the combustor; a fuel gas supply line that supplies fuel gas to the combustor; an exhausted fuel gas supply line that supplies exhausted fuel gas from the fuel cell to the combustor; a supply amount adjustment unit that adjust an amount of the fuel gas supplied from the fuel gas supply line to the combustor; and a control system including an information acquisition unit that acquires information from each unit, a calculation unit that executes a calculation process using the information acquired by the information acquisition unit, and a fuel gas supply control unit that controls the supply amount adjustment unit using a result calculated by the calculation unit and controls a flow volume of fuel gas supplied to the gas turbine. The information acquisition unit acquires an output command of the gas turbine, an atmospheric temperature, a temperature of the exhausted oxidant supplied to the gas turbine, and a temperature of the exhausted fuel gas supplied to the gas turbine, and the calculation unit calculates a heat input of the exhausted oxidant by a calculation using at least the temperature of the exhausted oxidant, calculates a heat input of the exhausted fuel gas by a calculation using at least the temperature of the exhausted fuel gas, executes a calculation by the output command and the atmospheric temperature to calculate a gas turbine heat input command, executes an calculation by the gas turbine heat input command and the heat input of the exhausted oxidant to calculate a gas turbine fuel heat input command, and executes a calculation by the gas turbine fuel heat input command and the heat input of the exhausted fuel gas to calculate a supply amount of the fuel gas.

Therefore, the heat input of the exhausted oxidant is calculated using at least the temperature of the exhausted oxidant and the heat input of the exhausted fuel gas is calculated using at least the temperature of the exhausted fuel gas, so that amounts of heat of various fluids supplied to the combustor can be more accurately calculated. Thereby, the gas turbine can be operated stably.

Advantageously, in the power generation system, the calculation unit calculates the heat input of the exhausted oxidant by the temperature of the exhausted oxidant and the flow rate of the exhausted oxidant.

Therefore, the heat input of the exhausted oxidant is calculated by the temperature of the exhausted oxidant and the flow rate of the exhausted oxidant, so that amounts of heat of various fluids supplied to the combustor can be more accurately calculated. Thereby, the gas turbine can be operated stably.

Advantageously, in the power generation system, the information acquisition unit acquires a command value for the fuel cell and information of a pressure of a casing of the gas turbine, and the calculation unit calculates the flow rate of the exhausted oxidant by the command value for the fuel cell and the information of the pressure of the casing of the gas turbine.

Therefore, the flow rate of the exhausted oxidant is calculated by the command value for the fuel cell and the information of the pressure of the casing of the gas turbine, so that amounts of heat of various fluids supplied to the combustor can be more accurately calculated. Thereby, the amount of heat supplied from the fuel cell can be accurately measured and the flow rate of the fuel gas necessary for stable operating and output control of the gas turbine can be accurately determined. As a result, the gas turbine can be operated stably.

Advantageously, in the power generation system, the information acquisition unit acquires the flow rate of the exhausted oxidant, and the calculation unit calculates the heat input of the exhausted oxidant by the temperature of the exhausted oxidant and the flow rate of the exhausted oxidant acquired by the information acquisition unit.

Therefore, the heat input of the exhausted oxidant is calculated by the temperature of the exhausted oxidant and the flow rate of the exhausted oxidant, so that amounts of heat of various fluids supplied to the combustor can be more accurately calculated. Thereby, the gas turbine can be operated stably.

Advantageously, in the power generation system, the information acquisition unit acquires a command value for the fuel cell, the calculation unit calculates a calorific value of the exhausted fuel gas and specific heat of the exhausted fuel gas, on the basis of the command value for the fuel cell, and the calculation unit calculates the heat input of the exhausted fuel gas by an calculation of the temperature of the exhausted fuel gas, the calorific value of the exhausted fuel gas, the specific heat of the exhausted fuel gas, and the flow rate of the exhausted fuel gas.

Therefore, the heat input of the exhausted fuel gas is calculated by the calorific value of the exhausted fuel gas, so that amounts of heat of various fluids supplied to the combustor can be more accurately calculated. Thereby, the amount of heat supplied from the fuel cell can be accurately measured and the flow rate of the fuel gas (fuel gas supplied from the fuel gas supply line) necessary for stable operating and output control of the gas turbine can be accurately determined. As a result, the gas turbine can be operated stably.

Advantageously, in the power generation system, the information acquisition unit acquires information of a pressure of a casing of the gas turbine, and the calculation unit calculates the flow rate of the exhausted fuel gas by an calculation of the command value for the fuel cell and the information of the pressure of the casing of the gas turbine.

Therefore, the flow rate of the exhausted fuel gas is calculated by the command value for the fuel cell and the information of the pressure of the casing of the gas turbine, so that amounts of heat of various fluids supplied to the combustor can be more accurately calculated. Thereby, the gas turbine can be operated stably. Here, as a method of calculating a pressure change speed of the casing, there is a method of calculating a pressure change speed of the casing from an aperture (or an aperture command) of an IGV (Inlet Guide Vane) which is a mechanism for changing a pressure of the casing, in addition to a method of calculating a pressure change speed of the casing from a direct measurement result of the pressure of the casing. In addition, as a method of calculating the flow rate of the exhausted oxidant, there is a method of directly measuring the flow rate of the exhausted oxidant.

Advantageously, in the power generation system, the information acquisition unit acquires the flow rate of the exhausted fuel gas, and the calculation unit calculates the heat input of the exhausted fuel gas by the temperature of the exhausted fuel gas and the flow rate of the exhausted fuel gas acquired by the information acquisition unit.

Therefore, the heat input of the exhausted fuel gas is calculated by the temperature of the exhausted fuel gas and the flow rate of the exhausted fuel gas, so that amounts of heat of various fluids supplied to the combustor can be more accurately calculated. Thereby, the amount of heat supplied from the fuel cell can be accurately measured and the flow rate of the fuel gas (fuel gas supplied from the fuel gas supply line) necessary for stable operating and output control of the gas turbine can be accurately determined. As a result, the gas turbine can be operated stably.

According to another aspect of the present invention, an operating method of a power generation system including a fuel cell, a gas turbine including a combustor, an exhausted oxidant line supplying exhausted oxidant from the fuel cell to the combustor, a fuel gas supply line supplying fuel gas to the combustor, an exhausted fuel gas supply line supplying exhausted fuel gas from the fuel cell to the combustor, and a supply amount adjustment unit adjusting an amount of the fuel gas supplied from the fuel gas supply line to the combustor, includes: a process for acquiring an output command of the gas turbine, an atmospheric temperature, a temperature of the exhausted oxidant supplied to the gas turbine, and a temperature of the exhausted fuel gas supplied to the gas turbine; a process for calculating a heat input of the exhausted oxidant using at least the temperature of the exhausted oxidant and calculating a heat input of the exhausted fuel gas by an calculation using at least the temperature of the exhausted fuel gas; a process for executing an calculation by the output command and the atmospheric temperature to calculate a gas turbine heat input command; a process for executing an calculation by the gas turbine heat input command and the heat input of the exhausted oxidant to calculate a gas turbine fuel heat input command; a process for executing an calculation by the gas turbine fuel heat input command and the heat input of the exhausted fuel gas to calculate a supply amount of the fuel gas; and a process for controlling the supply amount adjustment unit on the basis of the calculated supply amount of the fuel gas.

Therefore, the heat input of the exhausted oxidant is calculated using at least the temperature of the exhausted oxidant and the heat input of the exhausted fuel gas is calculated using at least the temperature of the exhausted fuel gas, so that amounts of heat of various fluids supplied to the combustor can be more accurately calculated. Thereby, the gas turbine can be operated stably.

Advantageous Effects of Invention

According to the power generation system and the operating method of the power generation system according to the present invention, because the control of the fuel flow rate for the gas turbine combustor can be performed by considering an operating state of an SOFC, precision of the flow rate command of the fuel gas can be increased and the gas turbine can be operated stably. In addition, according to the power generation system and the operating method of the power generation system according to the present invention, the control of the fuel flow rate for the combustor is performed by considering conditions of the exhausted fuel gas and the exhausted oxidant supplied from the SOFC to the combustor of the gas turbine. Therefore, even when the start-up and shout-down of the SOFC or the load change of the power generation system, output control (control of the fuel flow rate for the combustor of the gas turbine) can be appropriately performed. In addition, according to the power generation system and the operating method of the power generation system according to the present invention, because the deviation of the control of the fuel flow rate can be decreased, the operating can be continuously performed without the restriction of a load change speed according to the deviation of the control of the fuel flow rate.

DESCRIPTION OF EMBODIMENTS

Hereinafter, preferred embodiments of a power generation system and an operating method of the power generation system according to the present invention will be described in detail with reference to the accompanying drawings. The present invention is not limited by the embodiments and may include structures obtained by combining the embodiments in the case of the plurality of embodiments.

First Embodiment

A power generation system according to this embodiment is a triple combined cycle (registered trademark) in which a solid oxide fuel cell (hereinafter, referred to as an SOFC), a gas turbine, and a steam turbine are combined. Because the triple combined cycle can generate power in three steps of the SOFC, the gas turbine, and the steam turbine by arranging the SOFC on an upstream side of a gas turbine combined cycle power generation (GTCC), very high power generation efficiency can be realized. In the following description, the solid oxide fuel cell is applied as a fuel cell according to the present invention. However, the present invention is not limited to this type of fuel cell.

Figure 1:
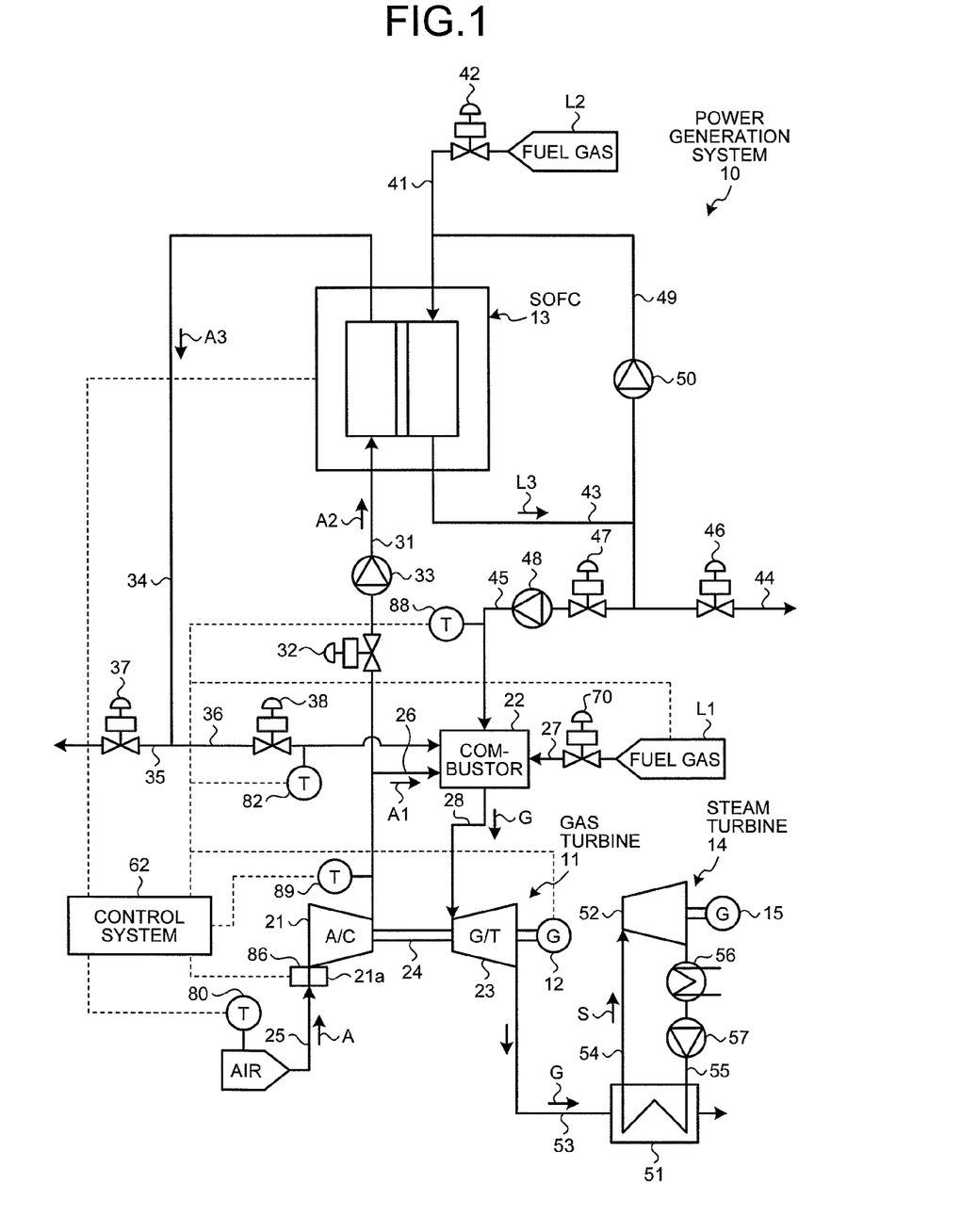
FIG. 1 is a schematic structural diagram illustrating a power generation system according to this embodiment.

FIG. 1 is a schematic structural diagram illustrating a power generation system according to this embodiment. In this embodiment, as illustrated in FIG. 1, a power generation system 10 has a gas turbine 11 and a power generator 12, an SOFC 13, and a steam turbine 14 and a power generator 15. The power generation system 10 is configured to combine power generation by the gas turbine 11, power generation by the SOFC 13, and power generation by the steam turbine 14 to obtain high power generation efficiency.

The gas turbine 11 has a compressor 21, a combustor 22, and a turbine 23. The compressor 21 and the turbine 23 are connected to be rotatable integrally by a rotation shaft 24. The compressor 21 compresses air A taken from an air intake line 25. In the compressor 21, an inlet guide vane (IGV) 21a that can adjust an aperture is provided in an air intake port. The compressor 21 increases the aperture of the inlet guide vane 21a to increase an amount of compressed air generated by the compressor 21 and decreases the aperture to decrease the amount of compressed air generated by the compressor 21. The combustor 22 mixes compressed air A1 supplied from the compressor 21 through a first compressed air supply line 26 and fuel gas L1 supplied from a first fuel gas supply line 27 and burns the compressed air and the fuel gas. The turbine 23 is rotated by flue gas G supplied from the combustor 22 through a flue gas supply line 28. Although not illustrated in the drawings, the compressed air A1 compressed by the compressor 21 is supplied to the turbine 23 through a casing and the turbine 23 cools down a blade using the compressed air A1 as cooling air. The power generator 12 is provided on the same shaft as the turbine 23 and can generate power according to rotation of the turbine 23. Here, liquefied natural gas (LNG), hydrocarbon gas such as hydrogen (H2), carbon monoxide (CO), and methane (CH4), and gas generated by gasification facilities of carbonaceous raw materials such as coal can be used as each fuel gas of the fuel gas L1 supplied to the combustor 22 and fuel gas L2 to be described below.

Fuel gas of a high temperature functioning as a reductant and air (oxidant) of a high temperature functioning as an oxidant are supplied to the SOFC 13 and the SOFC 13 reacts at a predetermined operating temperature and generates power. The SOFC 13 is configured by storing an air electrode (cathode), a solid electrolyte, and a fuel electrode (anode) in a pressure vessel. Partial compressed air (compressed oxidant) A2 compressed by the compressor 21 is supplied to the air electrode (cathode) and the fuel gas L2 is supplied to the fuel electrode (anode), so that power is generated. In addition, the oxidant supplied to the SOFC 13 is gas including oxygen of about 15 to 30% and air is generally used as the oxidant. However, in addition to the air, mixed gas of flue gas and air or mixed gas of oxygen and air may be used. Hereinafter, in this embodiment, the case in which the oxidant supplied to the SOFC 13 is the air will be described. In addition, exhausted oxidant that is discharged from the SOFC 13 becomes exhausted air. In addition, the oxidant supplied to the SOFC 13 or the exhausted oxidant is supplied to the power generation system 10.

A second compressed air supply line (compressed oxidant supply line) 31 branched from the first compressed air supply line 26 is connected to the SOFC 13 and can supply partial compressed air (compressed oxidant) A2 compressed by the compressor 21 to an introduction portion of the air electrode (cathode). In the second compressed air supply line 31, a control valve 32 that can adjust an amount of supplied air and a blower (booster) 33 that can increase pressure of the compressed air A2 are provided along a flow direction of the compressed air A2. The control valve 32 is provided on an upstream side of the flow direction of the compressed air A2 in the second compressed air supply line 31 and the blower 33 is provided on a downstream side of the control valve 32. In addition, an arrangement of the control valve 32 and the blower (booster) 33 is not limited to the arrangement of FIG. 1 and the control valve and the blower may be arranged in reverse order according to types of the blower (booster) and the control valve. An exhausted air line 34 that discharges the exhausted air (exhausted oxidant) A3 used by the air electrode (cathode) is connected to the SOFC 13. The exhausted air line 34 is branched into a discharge line 35 to discharge the exhausted air A3 used by the air electrode (cathode) to the outside and an exhausted air supply line (exhausted oxidant supply line) 36 connected to the combustor 22. That is, the exhausted air line 34 and the exhausted air supply line 36 function as an exhausted air supply line to supply the exhausted air A3 used by the air electrode (cathode) of the SOFC 13 to the combustor 22. In the discharge line 35, a control valve 37 that can adjust an amount of discharged air is provided. In the exhausted air supply line 36, a cut-off valve 38 to separate a system between the SOFC 13 and the gas turbine 11 is provided.

In the SOFC 13, a second fuel gas supply line 41 to supply the fuel gas L2 to an introduction portion of the fuel electrode (anode) is provided. In the second fuel gas supply line 41, a control valve 42 that can adjust an amount of supplied fuel gas is provided. An exhausted fuel line 43 to discharge the exhausted fuel gas L3 used by the fuel electrode (anode) is connected to the SOFC 13. The exhausted fuel line 43 is branched into a discharge line 44 to discharge the fuel to the outside and an exhausted fuel gas supply line 45 connected to the combustor 22. In the discharge line 44, a control valve 46 that can adjust an amount of discharged fuel gas is provided. In the exhausted fuel gas supply line 45, a control valve 47 that can adjust an amount of supplied fuel gas and a blower 48 that can increase pressure of the exhausted fuel gas L3 are provided along a flow direction of the exhausted fuel gas L3. The control valve 47 is provided on an upstream side of the flow direction of the exhausted fuel gas L3 in the exhausted fuel gas supply line 45 and the blower 48 is provided on a downstream side of the flow direction of the exhausted fuel gas L3 of the control valve 47. In addition, an arrangement of the control valve 47 and the blower (booster) 48 is not limited to the arrangement of FIG. 1 and the control valve and the blower may be arranged in reverse order according to types of the blower (booster) and the control valve.

In the SOFC 13, a fuel gas recirculation line 49 to connect the exhausted fuel line 43 and the second fuel gas supply line 41 is provided. In the fuel gas recirculation line 49, a recirculation blower 50 that makes the exhausted fuel gas L3 of the exhausted fuel line 43 circulate again through the second fuel gas supply line 41 is provided.

In the steam turbine 14, a turbine 52 is rotated by steam S generated by a heat recovery steam generator (HRSG) 51. A flue gas line 53 from the gas turbine 11 (turbine 23) is connected to the heat recovery steam generator 51 and the heat recovery steam generator performs a heat exchange between the water and the flue gas G of the high temperature and generates the steam S. Between the steam turbine 14 (turbine 52) and the heat recovery steam generator 51, a steam supply line 54 and a feed-water line 55 are provided. In addition, in the feed-water line 55, a condenser 56 and a feed-water pump 57 are provided. The power generator 15 is provided on the same shaft as the turbine 52 and can generate power according to rotation of the turbine 52. The flue gas G from which the heat is recovered by the heat recovery steam generator 51 is discharged to the atmosphere. In this embodiment, the flue gas G is used as a heat source of the HRSG 51. However, the flue gas G can be used as heat sources of various apparatuses other than the HRSG 51.

Here, a calculation of the power generation system 10 according to this embodiment will be described. When the power generation system 10 starts, the steam turbine 14 and the SOFC 13 start after the gas turbine 11 starts.

First, in the gas turbine 11, the compressor 21 compresses the air A, the combustor 22 mixes the compressed air A1 and the fuel gas L1 and burns the compressed air and the fuel gas, the turbine 23 is rotated by the flue gas G, and the power generator 12 starts power generation. Next, in the steam turbine 14, the turbine 52 is rotated by the steam S generated by the heat recovery steam generator 51. Thereby, the power generator 15 starts power generation.

In order to start the SOFC 13, the compressed air A2 is supplied from the compressor 21, pressurizing of the SOFC 13 starts, and heating starts. The control valve 37 of the discharge line 35 and the cut-off valve 38 of the exhausted air supply line 36 are closed and the control valve 32 is opened by a predetermined aperture, in a state in which the blower 33 of the second compressed air supply line 31 is stopped or in a state in which the blower 33 is operated. In the power generation system 10, a pressurizing dedicated control valve of the SOFC 13 may be provided and the corresponding control valve may be opened by the predetermined aperture. Here, aperture adjustment is performed to control an increase rate of pressure. In this case, the partial compressed air A2 compressed by the compressor 21 is supplied from the second compressed air supply line 31 to the SOFC 13. Thereby, the compressed air A2 is supplied to the SOFC 13 and a pressure of the SOFC increases.

Meanwhile, in the SOFC 13, the fuel gas L2 and compressed air (oxidant) from a branch of a compressed air line not illustrated in the drawings are supplied to the side of the fuel electrode (anode) to start increasing pressure. In the power generation system 10, a purge gas supply mechanism to supply purge gas to the fuel electrode (anode) may be provided and the purge gas may be supplied to the fuel electrode (anode) to increase pressure at the side of the fuel electrode (anode) of the SOFC 13. Here, inert gas such as nitrogen may be used as the purge gas. The control valve 46 of the discharge line 44 and the control valve 47 of the exhausted fuel gas supply line 45 are closed, the control valve 42 of the second fuel gas supply line 41 is opened in a state in which the blower 48 is stopped, and the recirculation blower 50 of the fuel gas recirculation line 49 starts. The recirculation blower 50 may start before pressurizing of the side of the fuel electrode (anode). In this case, the fuel gas L2 is supplied from the second fuel gas supply line 41 to the SOFC 13 and the exhausted fuel gas L3 is circulated again by the fuel gas recirculation line 49. Thereby, the fuel gas L2, the air, and the inert gas are supplied to the side of the fuel electrode (anode) of the SOFC 13 and the pressure increases. At this time, a pressure difference between the pressure of the side of the fuel electrode (anode) of the SOFC 13 and the pressure of the side of the air electrode (cathode) of the SOFC 13 is controlled within a predetermined value.

In addition, if the pressure of the side of the air electrode (cathode) of the SOFC 13 becomes an outlet pressure of the compressor 21, in the control valve 32, a flow rate of air supplied to the SOFC 13 is controlled. If the blower 33 does not start, the blower 33 starts. At the same time, the cut-off valve 38 is opened and the exhausted air A3 from the SOFC 13 is supplied from the exhausted air supply line 36 to the combustor 22. In this case, the compressed air A2 is supplied to the SOFC 13 by the blower 33. At the same time, the control valve 46 is opened and the exhausted fuel gas L3 from the SOFC 13 is discharged from the discharge line 44. In addition, if the pressure of the side of the air electrode (cathode) and the pressure of the side of the fuel electrode (anode) in the SOFC 13 reach a target pressure, the pressurizing of the SOFC 13 is completed.

Then, if the pressure control of the SOFC 13 is stabilized, the control valve 37 is closed when the control valve is opened and opening of the cut-off valve 38 is maintained. For this reason, the exhausted air A3 from the SOFC 13 is continuously supplied from the exhausted air supply line 36 to the combustor 22. In addition, if a component of the exhausted fuel gas L3 becomes a component that can be supplied to the combustor 22, the control valve 46 is closed. Meanwhile, the control valve 47 is opened and the blower 48 starts. In this case, the exhausted fuel gas L3 from the SOFC 13 is supplied from the exhausted fuel gas supply line 45 to the combustor 22. At this time, an amount of fuel gas L1 that is supplied from the first fuel gas supply line 27 to the combustor 22 is decreased.

Here, all of power generation in the power generator 12 by driven the gas turbine 11, power generation in the SOFC 13, and power generation in the power generator 15 by driven the steam turbine 14 are performed and the power generation system 10 is normally operated.

Next, control of the flow rate of the fuel gas supplied to the combustor 22 will be described. In the power generation system 10 according to this embodiment, a control valve 70 is provided in the first fuel gas supply line 27. The power generation system 10 controls the opening/closing and the aperture of the control valve 70, so that the power generation system can control the flow rate of the fuel gas L1 supplied from the first fuel gas supply line 27 to the combustor 22. A supply amount adjustment unit that controls the flow rate of the fuel gas L1 supplied to the combustor 22 may have a structure other than the control valve. For example, the supply amount adjustment unit may perform adjustment by a pump and a feeder.

In addition, the power generation system 10 according to this embodiment has an atmospheric temperature detection unit 80 that detects an atmospheric temperature, an exhausted air temperature detection unit 82 that is provided in the exhausted air supply line 36 and detects a temperature of exhausted air supplied to the combustor 22, an IGV aperture detection unit 86 that detects an aperture of the IGV 21a, an exhausted fuel gas temperature detection unit 88 that is provided in the exhausted fuel gas supply line 45 and detects a temperature of the exhausted fuel gas supplied to the combustor 22, and a reference temperature detection unit 89 that is provided in the second compressed air supply line 31 and detects a temperature of compressed air discharged from the compressor 21 as a reference temperature. The atmospheric temperature detection unit 80, the exhausted air temperature detection unit 82, the IGV aperture detection unit 86, the exhausted fuel gas temperature detection unit 88, and the reference temperature detection unit 89 transmit a detection result to a control system 62.

Figure 2:
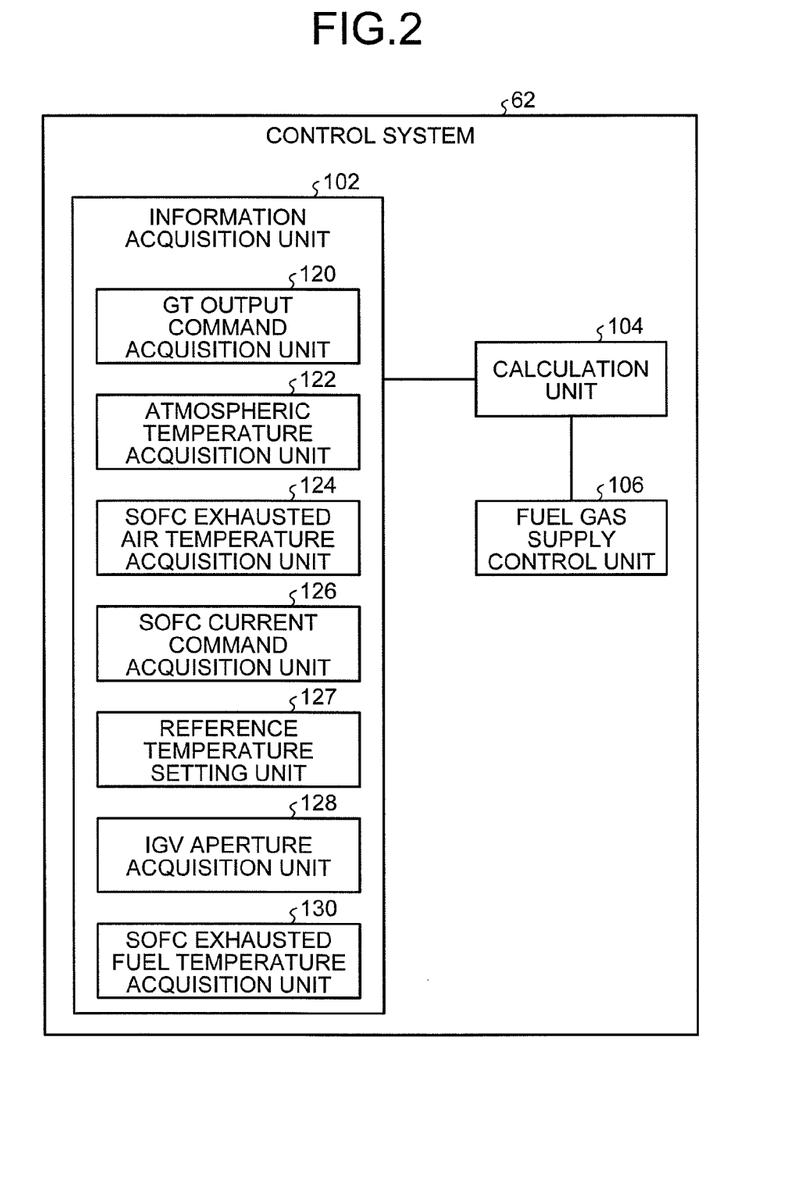
FIG. 2 is a schematic structural diagram illustrating a schematic structure of a control system of the power generation system according to this embodiment.

Next, a structure of the control system 62 will be described using FIG. 2. Here, FIG. 2 is a schematic structural diagram illustrating a schematic structure of the control system of the power generation system according to this embodiment. FIG. 2 illustrates an extraction structure of a function of controlling the flow rate of the fuel gas supplied to the combustor 22, among functions of the control system 62. The control system 62 has various functions.

The control system 62 has an information acquisition unit 102 that acquires information from each unit, an calculation unit 104 that executes an calculation on the basis of the information acquired by the information acquisition unit 102 and calculates a supply amount of the fuel gas L1 for the combustor 22, and a fuel gas supply control unit 106 that controls an operation of the control valve 70, on the basis of the supply amount of the fuel gas L1 for the combustor 22, which is calculated by the calculation unit 104. The information acquisition unit 102 has a GT output command acquisition unit 120, an atmospheric temperature acquisition unit 122, an SOFC exhausted air temperature acquisition unit 124, an SOFC current command acquisition unit 126, a reference temperature detection unit 127, an IGV aperture acquisition unit 128, and an SOFC exhausted fuel temperature acquisition unit 130.

The GT output command acquisition unit 120 acquires a command value of a power generation output (an instruction value of an amount of power generation) of the gas turbine 11 output from other function of the control system 62. The atmospheric temperature acquisition unit 122 acquires a detection result of an atmospheric temperature from the atmospheric temperature detection unit 80. The SOFC exhausted air temperature acquisition unit 124 acquires a detection result of a temperature of exhausted air from the exhausted air temperature detection unit 82. The SOFC current command acquisition unit 126 acquires a command value of a power generation output (an instruction value of an amount of power generation) of the SOFC 13 output from other function of the control system 62. The reference temperature setting unit 127 sets a reference temperature to calculate an amount of heat. The reference temperature setting unit 127 may set the reference temperature as the same temperature at all times or set a casing temperature as the reference temperature. The reference temperature setting unit 127 can select a supply source of the reference temperature by setting. When the reference temperature setting unit 127 sets the casing temperature as the reference temperature, the reference temperature setting unit 127 acquires information of the casing temperature from the reference temperature detection unit 89 and sets the acquired information as the reference temperature. That is, in the power generation system 10, when the casing temperature is set as the reference temperature, the reference temperature detection 89 is needed. Here, when most of compressed air of the outlet of the compressor 21 is supplied to the SOFC 13, the reference temperature setting unit 127 preferably sets the reference temperature as a constant setting value. In addition, when an amount of air supplied from the compressed air of the outlet of the compressor 21 to the SOFC 13 is small by partial topping, the reference temperature setting unit 127 preferably sets the reference temperature as the casing temperature. The reference temperature setting unit 127 sets the reference temperature as the casing temperature, so that the reference temperature setting unit 127 can set the reference temperature by considering a difference of sensible heat with air not supplied to the SOFC 13. The IGV aperture acquisition unit 128 acquires a detection result of an aperture of an IGV from the IGV aperture detection unit 86. The SOFC exhausted fuel temperature acquisition unit 130 acquires a detection result of the temperature of the exhausted fuel gas output from the exhausted fuel gas temperature detection unit 88. The information acquisition unit 102 acquires information from each unit as described above.

Figure 3:
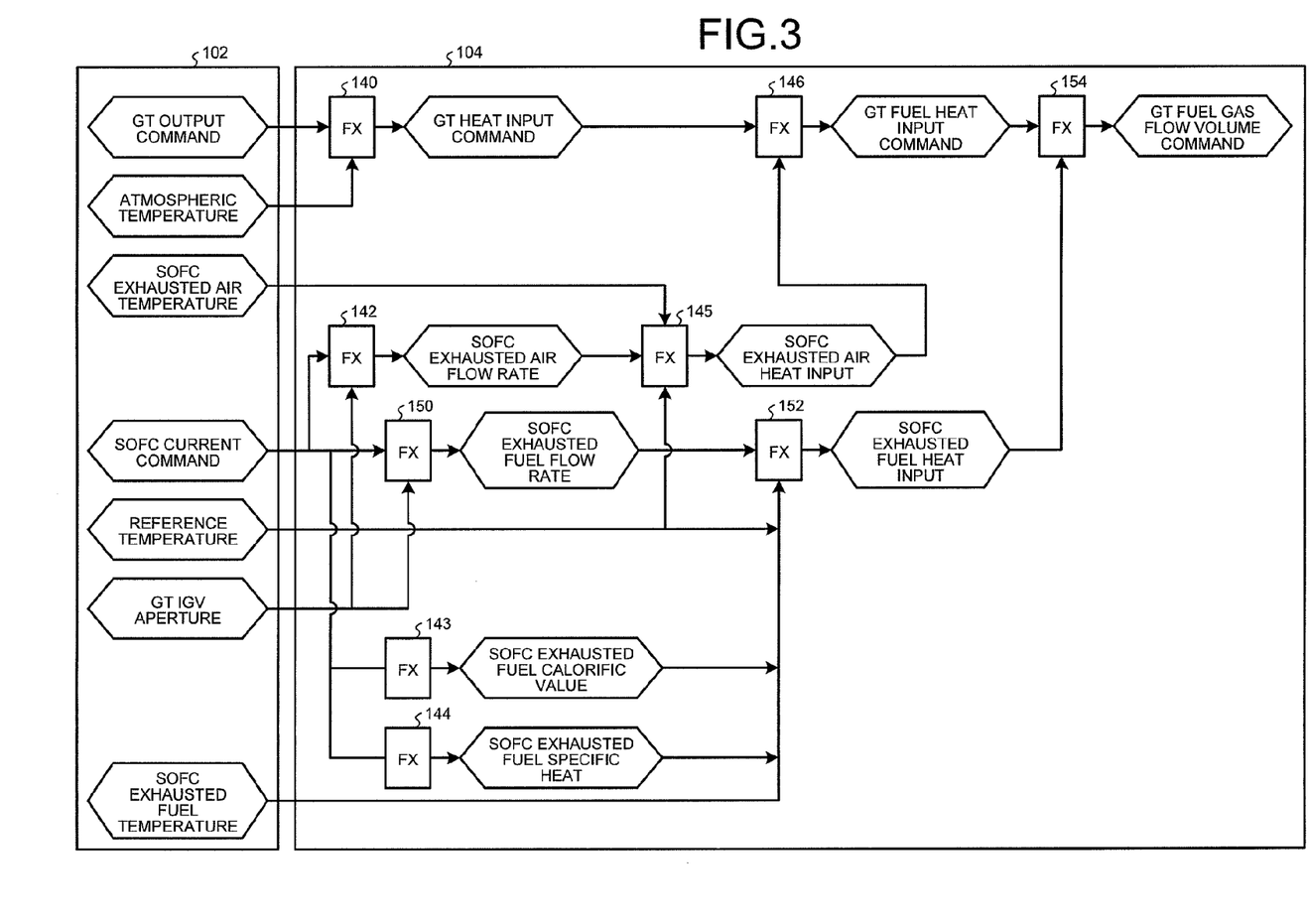
FIG. 3 is a diagram illustrating an example of a calculation of the power generation system according to this embodiment.

Next, a process of the calculation unit 104 will be described using FIG. 3. FIG. 3 is a diagram illustrating an example of a calculation of the power generation system according to this embodiment. The calculation unit 104 performs a calculation using input information by a set calculation formula, in each unit of calculation processing units 140, 142, 143, 144, 145, 146, 150, 152, and 154, and generates a flow rate command (GT fuel gas flow rate command) of the fuel gas supplied to the gas turbine.

First, the gas turbine power generation output command (GT output command), the atmospheric temperature, the exhausted air temperature (SOFC exhausted air temperature), the current command of the SOFC, the reference temperature, the aperture of the IGV (GT-IGV aperture), and the exhausted fuel temperature (SOFC exhausted fuel temperature) that are acquired by the individual units of the information acquisition unit 102 are input to the calculation unit 104. In the calculation unit 104, the calculation processing unit 140 executes an calculation process using the GT output command and the atmospheric temperature and calculates a gas turbine heat input command (GT heat input command).

In the calculation unit 104, the calculation processing unit 142 executes an calculation process using the SOFC current command and the GT-IGV aperture and calculates an SOFC exhausted air flow rate. As the supply air flow rate is set according to the SOFC current command, the calculation unit 104 calculates the supply air flow rate for the SOFC 13. In addition, for an amount of oxygen consumed from the supplied air, a consumption amount is calculated using the proportion of a current value of the SOFC 13 and a reacting oxygen mol flow rate. Thereby, a consumption amount of air in the SOFC can be calculated from the SOFC current command and an amount of exhausted air can be calculated by subtracting the consumption amount from the supply amount. In addition, the calculation processing unit 142 calculates a pressure change speed in a system of the SOFC from an output such as a change rate of the IGV aperture or a GT pressure change speed. An amount of exhausted air increasing or decreasing according to the pressure change is calculated on the basis of the pressure change speed in the system and a volume in the system and the calculated amount of exhausted air is adjusted. Thereby, the SOFC exhausted air flow rate is calculated.

In the calculation unit 104, the calculation processing unit 143 executes an calculation process using the SOFC current command and calculates an SOFC exhausted fuel calorific value. In addition, in the calculation unit 104, the calculation processing unit 144 executes an calculation process using the SOFC current command and calculates SOFC exhausted fuel specific heat. The calculation processing units 143 and 144 calculate a fuel flow rate supplied to the SOFC 13, on the basis of the SOFC current command, specify a gas composition after a power generation reaction in the SOFC 13, calculate a composition of an exhausted fuel, and calculate the SOFC exhausted fuel calorific value and the SOFC exhausted fuel specific heat.

In the calculation unit 104, the calculation processing unit 145 executes an calculation process using the SOFC exhausted air flow rate, the SOFC exhausted air temperature, and the reference temperature and calculates an SOFC exhausted air heat input. Specifically, the calculation processing unit 145 calculates the SOFC exhausted air heat input by the following calculation formula 1.

SOFC exhausted air flow rate×(SOFC exhausted air temperature−reference temperature)×exhausted air specific heat      Calculation formula 1:

Here, the exhausted air from the SOFC 13 is mixed gas of nitrogen and oxygen and a constant is used in the exhausted air specific heat, because a specific heat change by the gas composition is small.

In the calculation unit 104, the calculation processing unit 146 executes an calculation process using the GT heat input command and the SOFC exhausted air heat input and calculates a gas turbine fuel heat input command (GT fuel heat input command). Specifically, the calculation processing unit 146 calculates the gas turbine fuel heat input command by the following calculation formula 2.

$GT$ heat input command−SOFC exhausted air heat input      Calculation formula 2:

In the calculation processing unit 104, the calculation processing unit 150 executes an calculation process using the SOFC current command and the GT IGV aperture and calculates an SOFC exhausted fuel flow rate. The calculation unit 104 processes the SOFC current command and calculates a flow rate of the fuel gas supplied to the SOFC 13. In addition, the supplied fuel gas is converted by a reaction of the fuel and the oxygen moved from the air side in proportional to an SOFC current and a chemical reaction (reforming reaction) in the SOFC. Thereby, a reaction amount of the fuel gas can be calculated from the SOFC current command by the SOFC and a flow rate of the exhausted fuel gas can be calculated from the supply amount and the reaction amount. In addition, the calculation processing unit 150 calculates the pressure change speed in the system of the SOFC from the information such as the change rate of the IGV aperture or the GT pressure change speed. An amount of exhausted fuel increasing or decreasing according to the pressure change is calculated on the basis of the pressure change speed in the system and the volume in the system. The calculated amount of exhausted fuel is corrected in proportional to the change in the amount of exhausted fuel. Thereby, the SOFC exhausted fuel flow rate is calculated.

In the calculation unit 104, the calculation processing unit 152 executes an calculation process using the SOFC exhausted fuel flow rate, the SOFC exhausted fuel temperature, the reference temperature, the SOFC exhausted fuel calorific value, and the SOFC exhausted fuel specific heat and calculates the SOFC exhausted fuel heat input. Specifically, the calculation processing unit 152 calculates the SOFC exhausted fuel heat input by the following calculation formula 3.

SOFC exhausted fuel flow rate×((SOFC exhausted fuel calorific value+(SOFC exhausted fuel temperature−reference temperature)×SOFC exhausted fuel specific heat)      Calculation formula 3:

In the calculation unit 104, the calculation processing unit 154 executes an calculation process using the GT fuel heat input command and the SOFC exhausted fuel heat input and calculates the gas turbine fuel gas flow rate command (GT fuel gas flow rate command). Specifically, the calculation processing unit 154 calculates the gas turbine fuel gas flow rate command by the following calculation formula 4.

(GT fuel heat input command−SOFC exhausted fuel heat input)/calorific value of fuel gas   Calculation formula 4:

The control system 62 executes the calculation as described above, so that the control system can calculate the flow rate of the fuel gas supplied to the combustor of the gas turbine, in addition to the atmospheric temperature, the exhausted air temperature, the exhausted fuel temperature, the exhausted air flow rate, and the exhausted fuel flow rate. Thereby, the flow rate of the fuel gas can be calculated more accurately. For example, when the start and stop of the SOFC 13 or the load of the power generation system changes, even though the components, the flow rates, and the temperatures of the exhausted fuel gas and the exhausted air change, the supply amount of the fuel gas is adjusted by performing the above control and burning and output control in the combustor of the gas turbine can be stabilized. Thereby, the gas turbine can be operated stably and the operating condition of the gas turbine is kept mild. Because the deviation of the fuel flow rate control can be decreased by the above control, the operating of the gas turbine can be continuously performed without the restriction of a load change speed according to the deviation of the fuel flow rate control.

The structure of the power generation system is not limited to this embodiment and the structure can be applied with various aspects. For example, in this embodiment, because the pressure of the casing of the gas turbine is changed by the change of the aperture of the IGV, the aperture of the IGV is detected. However, when the pressure does not change, the aperture of the IGV may not be detected. In addition, a parameter other than the aperture of the IGV may be used as a parameter to detect the change of the pressure of the casing of the gas turbine. For example, the casing pressure change speed of the gas turbine may be detected. In addition, the detection of the aperture of the IGV may be performed by the acquisition of the control command signal, instead of the sensor. In addition, the power generation system 10 detects the aperture of the IGV and detects the pressure of the casing, on the basis of the aperture of the IGV. However, the present invention is not limited thereto. The power generation system 10 may directly detect the pressure of the casing by the sensor, instead of detection of the aperture of the IGV. In addition, the power generation system 10 detects the pressure of the casing on the basis of the aperture of the IGV and calculates the flow rate of the exhausted air on the basis of the pressure of the casing. However, the present invention is not limited thereto. The power generation system 10 may detect the flow rate by the sensor, instead of detection of the aperture of the IGV. By directly detecting the flow rate, the flow amount of the exhausted air can be acquired.

Second Embodiment

Figure 4:
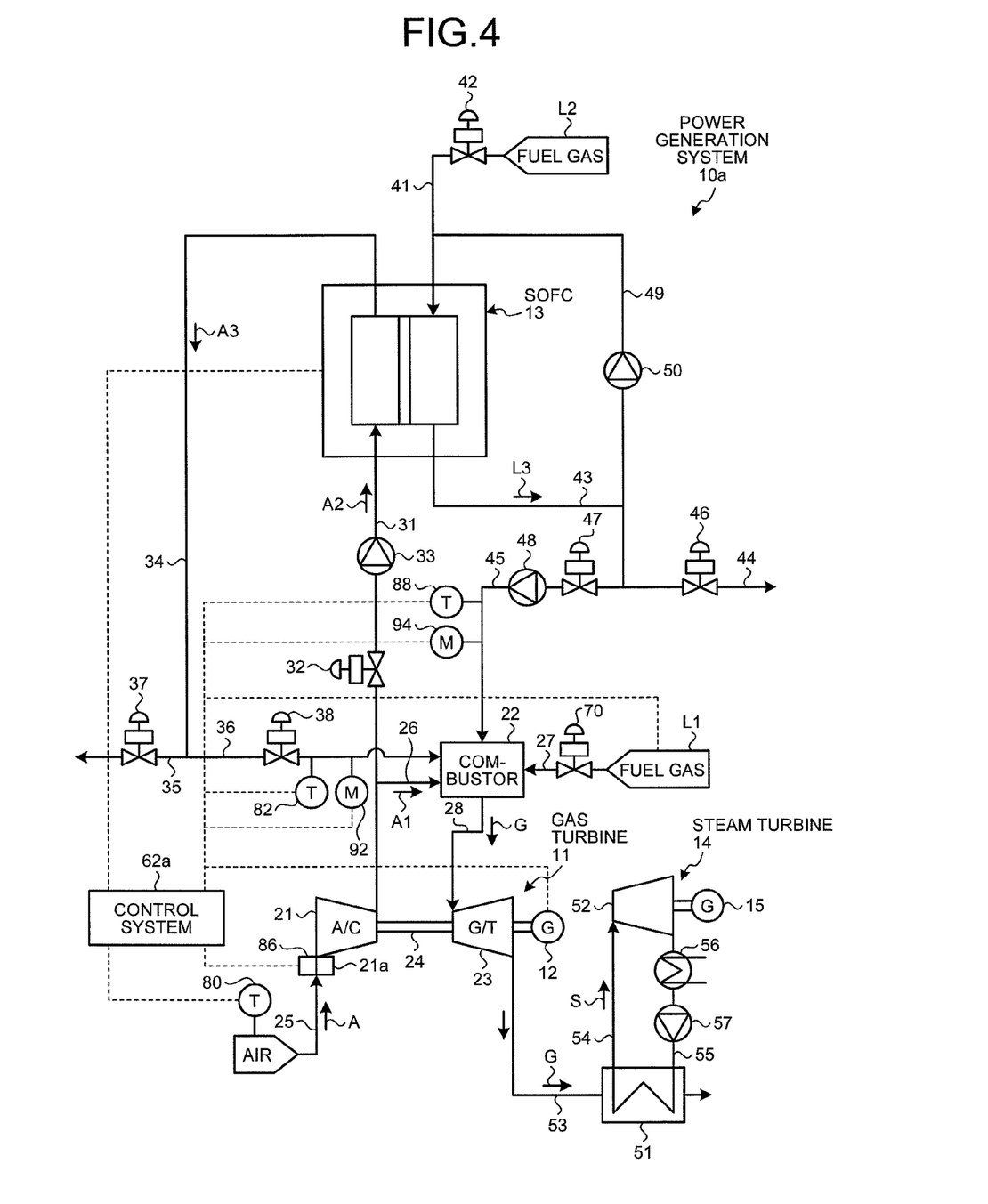
FIG. 4 is a schematic structural diagram illustrating a power generation system according to another embodiment.
Figure 5:
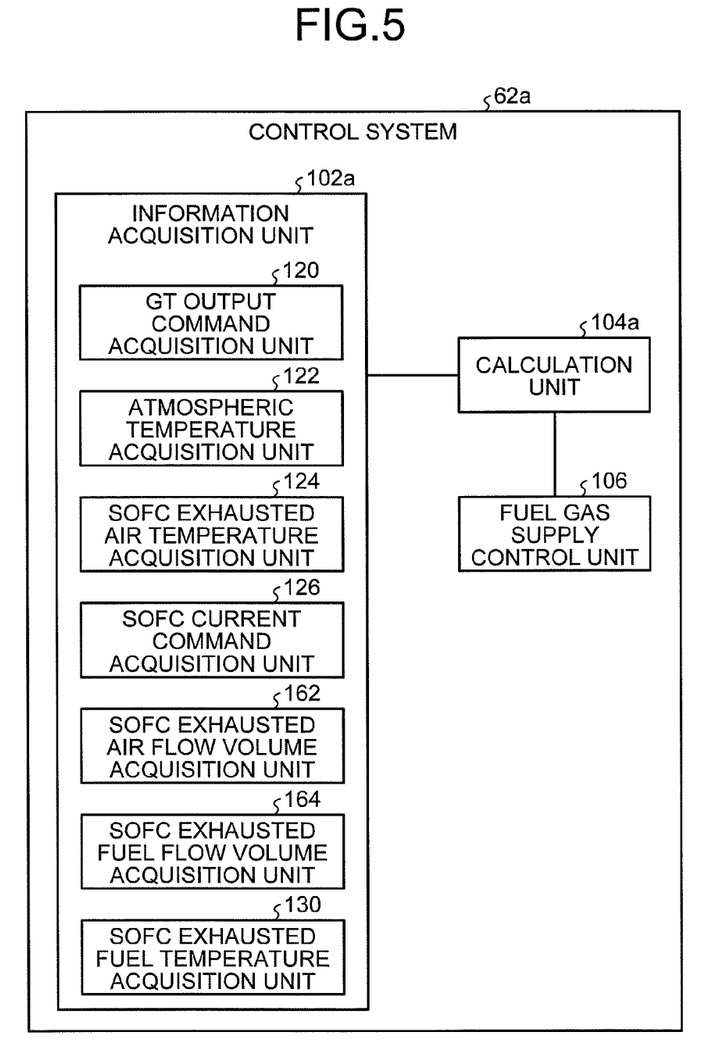
FIG. 5 is a schematic structural diagram illustrating a schematic structure of a control system of the power generation system according to another embodiment.
Figure 6:
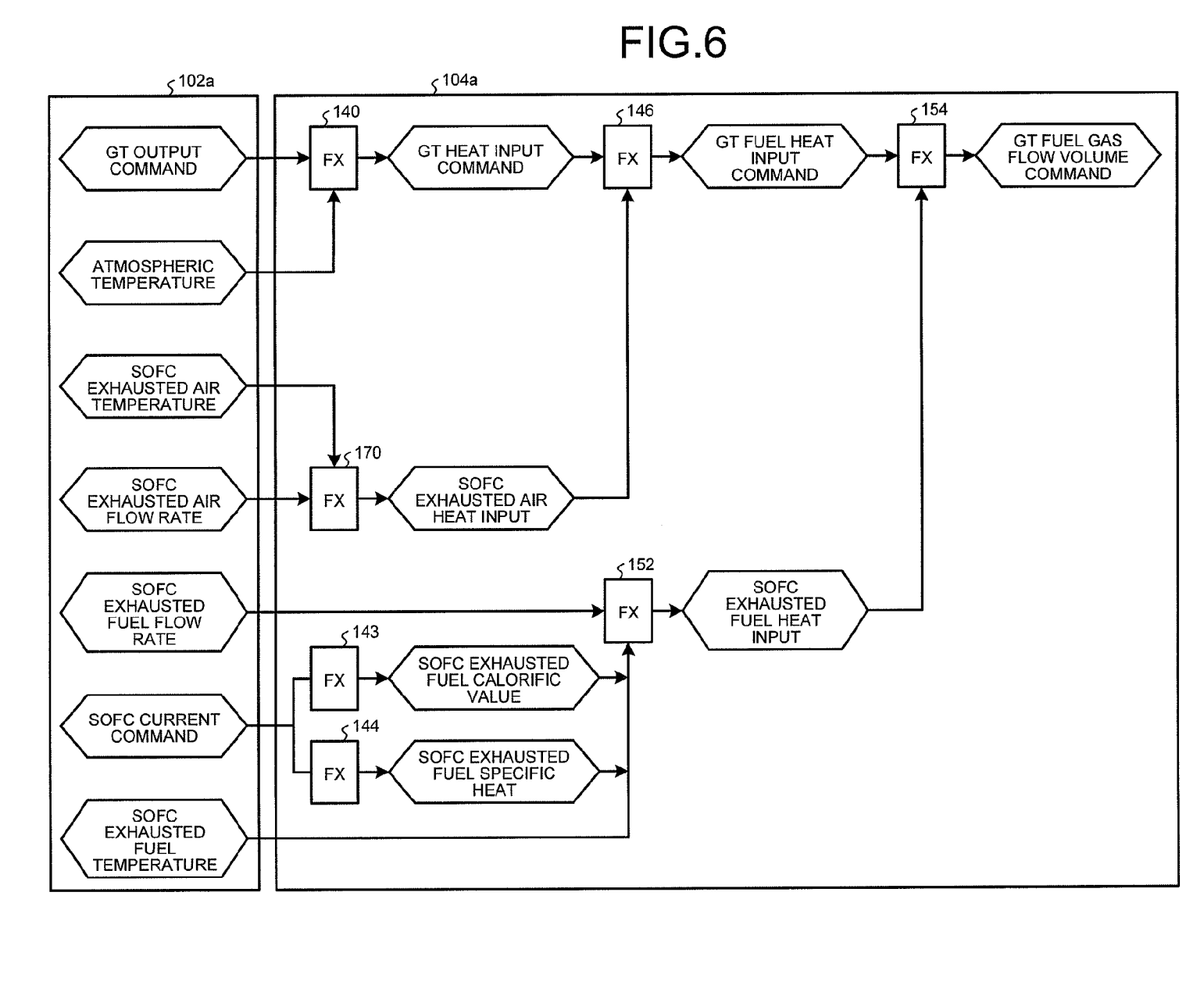
FIG. 6 is a diagram illustrating an example of a calculation of the power generation system according to another embodiment.

Next, a power generation system according to another embodiment will be described using FIGS. 4 to 6. FIG. 4 is a schematic structural diagram illustrating the power generation system according to another embodiment. FIG. 5 is a schematic structural diagram illustrating a schematic structure of a control system of the power generation system according to another embodiment. FIG. 6 is a diagram illustrating an example of a calculation of the power generation system according to another embodiment. A structure of a power generation system 10a illustrated in FIGS. 4 to 6 is basically the same as the structure of the power generation system 10, except that detection is performed using the exhausted air flow rate, the exhausted fuel gas flow rate, and the sensor and the IGV aperture to calculate the pressure change speed is not measured. Hereinafter, a peculiar point of the power generation system 10a will be mainly described.

The power generation system 10a further has an exhausted air flow rate detection unit 92 that is provided in the exhausted air supply line 36 and detects the flow rate of the exhausted air supplied to the combustor 22 and an exhausted fuel gas flow rate detection unit 94 that is provided in the exhausted fuel gas supply line 45 and detects the flow rate of the exhausted fuel gas supplied to the combustor 22, in addition to the structure of the power generation system 10.

Next, a control system 62a has an information acquisition unit 102a, a calculation unit 104a, and a fuel gas supply control unit 106. The information acquisition unit 102a has a GT output command acquisition unit 120, an atmospheric temperature acquisition unit 122, an SOFC exhausted air temperature acquisition unit 124, an SOFC current command acquisition unit 126, an SOFC exhausted fuel temperature acquisition unit 130, an SOFC exhausted air flow rate acquisition unit 162, and an SOFC exhausted fuel flow rate acquisition unit 164.

The SOFC exhausted air flow rate acquisition unit 162 acquires a detection result of the flow rate of the exhausted air from the exhausted air flow rate detection unit 92. The SOFC exhausted fuel flow rate acquisition unit 164 acquires a detection result of the flow rate of the exhausted fuel gas from the exhausted fuel gas flow rate detection unit 94.

Next, the calculation unit 104a performs an calculation for input information by a set calculation formula, in each unit of calculation processing units 140, 143, 144, 146, 152, 154, and 170, and generates a flow rate command (GT fuel gas flow rate command) of the fuel gas supplied to the gas turbine.

In the calculation unit 104a, the calculation processing unit 170 executes an calculation process using the SOFC exhausted air flow rate and the SOFC exhausted air temperature input from the information acquisition unit 102a and calculates an SOFC exhausted air heat input. Specifically, the calculation processing unit 170 calculates the SOFC exhausted air heat input by the above-described calculation formula 1. In this embodiment, the air temperature of the outlet of the compressor 21 or the temperature of the compressed air in the inlet of the combustor 22 may be used as the reference temperature. The power generation system 10a may use a measurement result of the casing temperature or a measurement result of the temperature of the compressed air other than the constant setting value as the reference temperature. Here, when most of compressed air of the outlet of the compressor 21 is supplied to the SOFC 13, the power generation system 10a preferably sets the reference temperature as the air temperature of the outlet of the compressor 21. In addition, when an amount of air supplied from the compressed air of the outlet of the compressor 21 to the SOFC 13 is small by partial topping, the reference temperature setting unit 127 preferably sets the reference temperature as the temperature of the compressed air in the inlet of the combustor 22. The reference temperature setting unit 127 sets the reference temperature as the temperature of the compressed air in the inlet of the combustor 22, so that the reference temperature setting unit 127 can set the reference temperature by considering a difference of sensible heat with air not supplied to the SOFC 13. In addition, the power generation system 10a may use the same reference temperature as the power generation system 10. The control system 62a may further include a reference temperature setting unit, when setting of the reference temperature is changed. In addition, a constant may be used in the exhausted air specific heat by the same reason as the first embodiment.

Even though the exhausted air flow rate and the exhausted fuel flow rate are detected by the sensor, the power generation system 10a can control the flow rate of the fuel gas using the same parameter as the power generation system 10. Thereby, the same effect as the power generation system 10 can be obtained. In addition, the power generation system 10a can detect the exhausted air flow rate and the exhausted fuel flow rate by the sensor to simplify the calculation process.

REFERENCE SIGNS LIST 10, 10a POWER GENERATION SYSTEM
11 GAS TURBINE
12 POWER GENERATOR
13 SOFC (SOLID OXIDE FUEL CELL: FUEL CELL)
14 STEAM TURBINE
15 POWER GENERATOR
21 COMPRESSOR
21a IGV
22 COMBUSTOR
23 TURBINE
25 AIR INTAKE LINE
26 FIRST COMPRESSED AIR SUPPLY LINE
27 FIRST FUEL GAS SUPPLY LINE
31 SECOND COMPRESSED AIR SUPPLY LINE (COMPRESSED OXIDANT SUPPLY LINE)
32 CONTROL VALVE
33, 48 BLOWER
34 EXHAUSTED AIR LINE (EXHAUSTED OXIDANT LINE)
36 EXHAUSTED AIR SUPPLY LINE (EXHAUSTED OXIDANT SUPPLY LINE)
41 SECOND FUEL GAS SUPPLY LINE
42 CONTROL VALVE
43 EXHAUSTED FUEL LINE
44 DISCHARGE LINE
45 EXHAUSTED FUEL GAS SUPPLY LINE
47 CONTROL VALVE
49 FUEL GAS RECIRCULATION LINE
50 RECIRCULATION BLOWER
51 EXHAUSTED HEAT RECOVERY STEAM GENERATOR
52 TURBINE
53 FLUE GAS LINE
54 STEAM SUPPLY LINE
55 FEED-WATER LINE
56 CONDENSER
57 FEED-WATER PUMP
80 ATMOSPHERIC TEMPERATURE DETECTION UNIT
82 EXHAUSTED AIR TEMPERATURE DETECTION UNIT
86 IGV APERTURE DETECTION UNIT
88 EXHAUSTED FUEL GAS TEMPERATURE DETECTION UNIT
89 REFERENCE TEMPERATURE DETECTION UNIT
92 EXHAUSTED AIR FLOW RATE DETECTION UNIT
94 EXHAUSTED FUEL GAS FLOW RATE DETECTION UNIT
102 INFORMATION ACQUISITION UNIT
104, 104a CALCULATION UNIT
106 FUEL GAS SUPPLY CONTROL UNIT
120 GT OUTPUT COMMAND ACQUISITION UNIT
122 ATMOSPHERIC TEMPERATURE ACQUISITION UNIT
124 SOFC EXHAUSTED AIR TEMPERATURE ACQUISITION UNIT
126 SOFC CURRENT COMMAND ACQUISITION UNIT
127 REFERENCE TEMPERATURE SETTING UNIT
128 IGV APERTURE ACQUISITION UNIT
130 SOFC EXHAUSTED FUEL TEMPERATURE ACQUISITION UNIT
140, 142, 143, 144, 145, 146, 150, 152, 154, 170 CALCULATION PROCESSING UNIT
162 SOFC EXHAUSTED AIR FLOW RATE ACQUISITION UNIT
164 SOFC EXHAUSTED FUEL FLOW RATE ACQUISITION UNIT

The invention claimed is:
1. A power generation system comprising:
a fuel cell;
a gas turbine including a combustor;
an exhausted oxidant line that supplies exhausted oxidant from the fuel cell to the combustor;
a fuel gas supply line that supplies fuel gas to the combustor;
an exhausted fuel gas supply line that directly supplies exhausted fuel gas from the fuel cell to the combustor;
a supply amount adjustment unit that adjust an amount of the fuel gas supplied from the fuel gas supply line to the combustor; and
a control system including an information acquisition unit that acquires operational information, a calculation unit that executes a calculation process using the information acquired by the information acquisition unit, and a fuel gas supply control unit that controls the supply amount adjustment unit using a result operated by the calculation unit to control a flow rate of the fuel gas supplied to the combustor of the gas turbine,
wherein the information acquisition unit acquires an output command of the gas turbine, an atmospheric temperature, a temperature of the exhausted oxidant supplied to the gas turbine, and a temperature of the exhausted fuel gas supplied to the gas turbine, and
the calculation unit calculates a heat input of the exhausted oxidant using at least the temperature of the exhausted oxidant, calculates a heat input of the exhausted fuel gas by a calculation using at least the temperature of the exhausted fuel gas, calculates using the output command and the atmospheric temperature to calculate a gas turbine heat input command, executes a calculation by the gas turbine heat input command and the heat input of the exhausted oxidant to calculate a gas turbine fuel heat input command, and executes a calculation by the gas turbine fuel heat input command and the heat input of the exhausted fuel gas to calculate a supply amount of the fuel gas.

2. The power generation system according to claim 1,
wherein the calculation unit calculates the heat input of the exhausted oxidant by the temperature of the exhausted oxidant and the flow rate of the exhausted oxidant.

3. The power generation system according to claim 2,
wherein the information acquisition unit acquires a command value for the fuel cell and information of a pressure of a casing of the gas turbine, and
the calculation unit calculates the flow rate of the exhausted oxidant by a calculation of the command value for the fuel cell and the information of the pressure of the casing of the gas turbine.

4. The power generation system according to claim 2,
wherein the information acquisition unit acquires the flow rate of the exhausted oxidant, and
the calculation unit calculates the heat input of the exhausted oxidant by the temperature of the exhausted oxidant and the flow rate of the exhausted oxidant acquired by the information acquisition unit.

5. The power generation system according to claim 1,
wherein the information acquisition unit acquires a command value for the fuel cell,
the calculation unit calculates a calorific value of the exhausted fuel gas and specific heat of the exhausted fuel gas, on the basis of the command value for the fuel cell, and
the calculation unit calculates the heat input of the exhausted fuel gas by the temperature of the exhausted fuel gas, the calorific value of the exhausted fuel gas, the specific heat of the exhausted fuel gas, and the flow rate of the exhausted fuel gas.

6. The power generation system according to claim 5,
wherein the information acquisition unit acquires information of a pressure of a casing of the gas turbine, and
the calculation unit calculates the flow rate of the exhausted fuel gas by the command value for the fuel cell and of the pressure of the casing of the gas turbine.

7. The power generation system according to claim 5,
wherein the information acquisition unit acquires the flow rate of the exhausted fuel gas, and
the calculation unit calculates the heat input of the exhausted fuel gas by the temperature of the exhausted fuel gas and the flow rate of the exhausted fuel gas acquired by the information acquisition unit.

8. An operating method of a power generation system including a fuel cell, a gas turbine including a combustor, an exhausted oxidant line supplying exhausted oxidant from the fuel cell to the combustor, a fuel gas supply line directly supplying fuel gas to the combustor, an exhausted fuel gas supply line supplying exhausted fuel gas from the fuel cell to the combustor, and a supply amount adjustment unit adjusting an amount of the fuel gas supplied from the fuel gas supply line to the combustor, the operating method comprising:
a process for acquiring an output command of the gas turbine, an atmospheric temperature, a temperature of the exhausted oxidant supplied to the gas turbine, and a temperature of the exhausted fuel gas supplied to the gas turbine;
a process for calculating a heat input of the exhausted oxidant using at least the temperature of the exhausted oxidant and calculating a heat input of the exhausted fuel gas using at least the temperature of the exhausted fuel gas;
a process for calculating by the output command and the atmospheric temperature to calculate a gas turbine heat input command;
a process for calculating by the gas turbine heat input command and the heat input of the exhausted oxidant to calculate a gas turbine fuel heat input command;
a process for calculating by the gas turbine fuel heat input command and the heat input of the exhausted fuel gas to calculate a supply amount of the fuel gas; and
a process for controlling the supply amount adjustment unit on the basis of the calculated supply amount of the fuel gas.

* * * * *